Feb. 2, 1965 G. W. KIBBEE 3,168,595
DIFFUSER UNIT FOR WASTE PRODUCTS TREATMENT APPARATUS
Filed Sept. 18, 1961 2 Sheets-Sheet 1

INVENTOR.
Gary W. Kibbee
BY
Hooey, Schmidt, Johnson & Hooey.
ATTORNEYS.

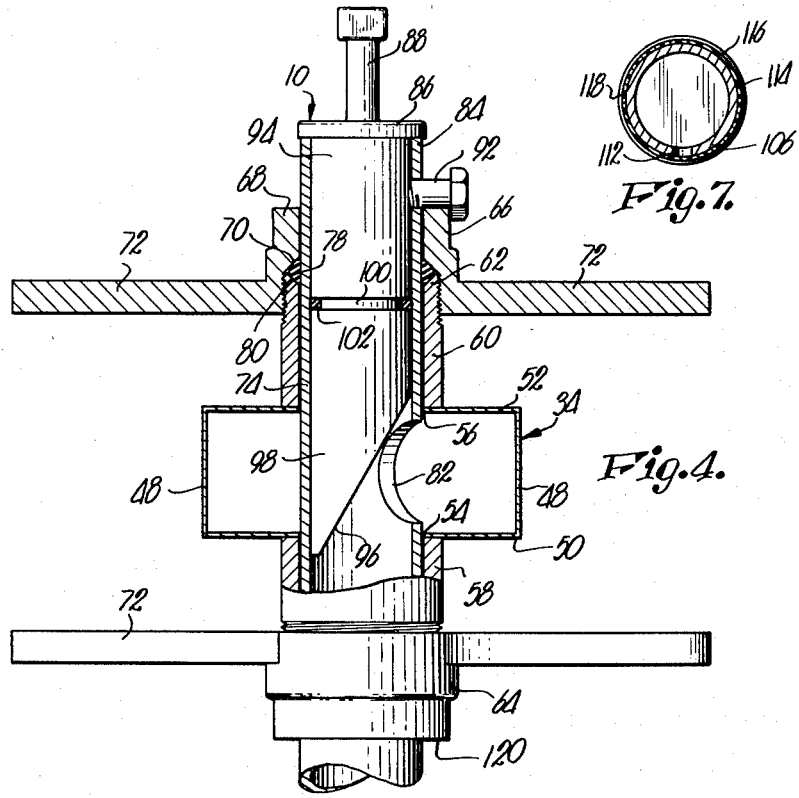
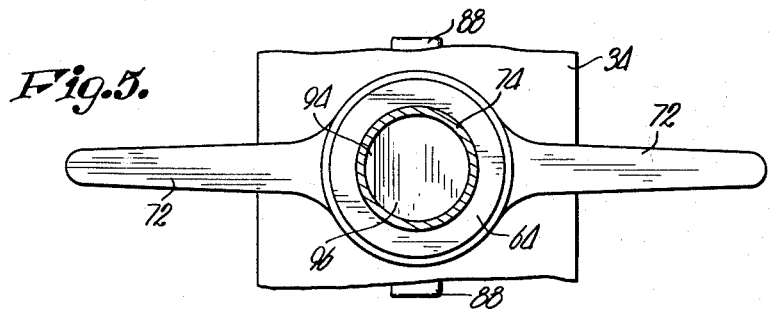
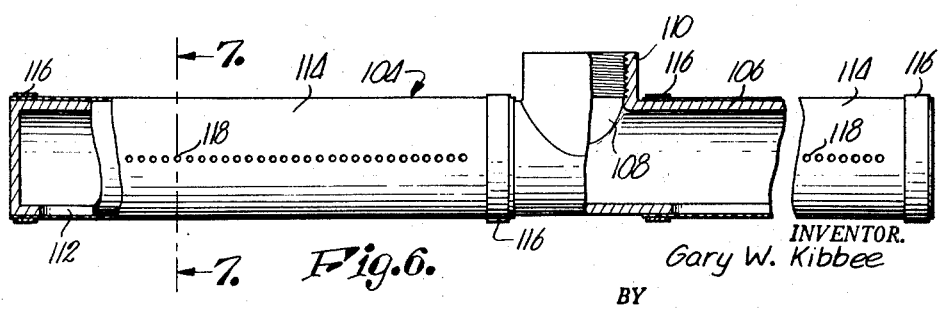

United States Patent Office 3,168,595
Patented Feb. 2, 1965

3,168,595
DIFFUSER UNIT FOR WASTE PRODUCTS
TREATMENT APPARATUS
Gary W. Kibbee, Kansas City, Kans., assignor to Union
Tank Car Company, Chicago, Ill., a corporation of
New Jersey
Filed Sept. 18, 1961, Ser. No. 138,872
10 Claims. (Cl. 261—24)

This invention relates to liquid treatment apparatus, and more particularly to a diffuser unit for use in introducing a fluid into a liquid for distribution of the fluid throughout the liquid being treated. The diffuser structure is particularly adapted to be used for aerating liquid wastes whether of the domestic sewage or industrial waste type.

It is the primary object of the present invention to provide novel fluid diffusing means for introducing treatment fluid into the substantially liquid waste products contained within a waste disposal tank, and wherein the diffusing means comprises a plurality of diffuser units adapted to extend into the liquid waste material and movable substantially vertically out of the latter for inspection purposes, the diffuser units being constructed of relatively lightweight material which is commercially available and readily adaptable to existing waste product treatment structures so that a single workman may lift the diffuser units out of the sewage when it is required to inspect or replace the same. In this respect it is an important object to provide a diffuser unit as described which may be mounted on existing waste disposal tanks without modification of the latter being required.

Another object of the present invention is the provision of diffuser units of the aforesaid character which may be readily lifted out of the liquid waste material contained within a waste disposal tank, and wherein means is included for removing excess waste solids from the exterior of the diffuser units as the same are lifted out of the tank whereby the diffuser units are substantially self-cleaning while being removed from the tank to thereby preclude the contamination of structures and the atmosphere surrounding the tank when it is desired to inspect the diffuser units.

A further object of the present invention is the provision of diffuser units as referred to above, wherein each of the units comprises an elongated, tubular conduit which is adapted to extend into the liquid waste material within a waste disposal tank and mounted on a fluid delivery manifold for shiftable movement substantially vertically out of the tank, whereby the conduits may be grasped by a single individual and raised out of the tank to thereby preclude the necessity of employing bulky apparatus as has heretofore been required to accomplish raising of the diffuser units.

Another object of the present invention is the provision of novel fluid valve means within the aforesaid conduits for metering the treatment fluid supplied to the latter, whereby a predetermined amount of fluid may be supplied to the conduits and thereby to the substantially liquid waste material in the waste disposal tank associated therewith, depending upon the requirements for processing of the waste material.

Still another object of the present invention is the provision of a diffuser head operably coupled to the conduits for supplying treatment fluid to the waste products under pressure wherein the diffuser heads are provided with flexible sleeve means thereon which alternately inflate and deflate as fluid is supplied to the diffuser head, whereby solid waste material is prevented from forming on the diffuser head while fluid is issuing from the latter to thereby prevent the clogging of the perforations in the head through which the air issues.

Yet another object of the present invention is the provision of a flexible sleeve of the aforesaid character which surrounds a tubular component secured to the lowermost end of the aforesaid conduit in closing relationship to a plurality of perforations in the component, whereby the sleeve serves as a seal to prevent the reverse flow of waste products into the component and conduit when the fluid supply is removed from the latter.

Still another object of the present invention is the provision of a diffusing unit adapted to be utilized with a waste disposal tank and wherein the unit includes a plurality of spaced conduits of the aforesaid character shiftably mounted on and in fluid communication with a fluid delivery manifold for delivering treatment fluid to the waste products when the conduits extend into the latter, whereby the fluid may be delivered to the manifold and then to conduits extending into the waste products even though one or a number of conduits has been removed from the sewage.

A further important object of this invention is the provision of a diffuser unit which is especially useful with sewage treatment apparatus for aerating the sewage by uniformly and efficiently delivering air to the sewage for diffusion thereinto.

Other objects of the present invention will become apparent as the following specification progresses, reference being had to the accompanying drawings, wherein:

FIG. 4 is a fragmentary, elevational view of a portion of the diffusing unit which forms the subject of the present invention and illustrating the conduit thereof operably coupled to an air-delivery manifold adapted to be secured to a sewage disposal tank adjacent the top thereof, parts being broken away and in section to illustrate details of construction;

FIG. 5 is a bottom plan view of the diffusing unit illustrated in FIG. 4;

FIG. 6 is a side elevational view of a diffuser head which is coupled with the conduit illustrated in FIG. 4, parts being broken away in section to illustrate details of construction; and FIG. 7 is a cross-sectional view taken along line 7—7 of FIG. 6.

The present invention provides a diffusing unit for supplying fluid under pressure to the substantially liquid products contained within a waste disposal tank. Although the apparatus has utility in various fields including the carbonation of liquids such as water, the treatment of industrial wastes, and the aeration of domestic sewage, the diffuser units have particular utility in the treatment of domestic sewage waste and the description hereafter is substantially limited to that utility of the equipment. It is to be understood, however, as noted above, that the diffuser units could be utilized in various capacities where it is required that a fluid be introduced into a liquid for diffusion into the latter. With respect to the use of the diffuser units in the treatment of sewage, it is to be noted that the apparatus includes an air delivery manifold which is adapted to be operably coupled to a source of air under pressure and to be secured to a sewage treatment tank adjacent the top thereof. An elongated conduit is shiftably mounted on the manifold in fluid communication therewith for movement into and out of the sewage along a substantially vertical path. A perforated diffuser head is secured to the normally lowermost end of the conduit for delivering air under pressure to the sewage, and is shiftable vertically with said conduit when the latter is raised out of the sewage. A flexible sleeve is in surrounding engagement with the diffuser head and is provided with a plurality of orifices which are out of alignment with the perforations in the head to provide an anticlogging device for the latter when air is supplied to the head from said air delivery manifold through the associated conduit.

Valve means is provided for the conduit for metering the amount of air flowing into the latter from the manifold to limit the amount of air supplied to the sewage, depending upon the requirements for processing the same.

Figure 1:
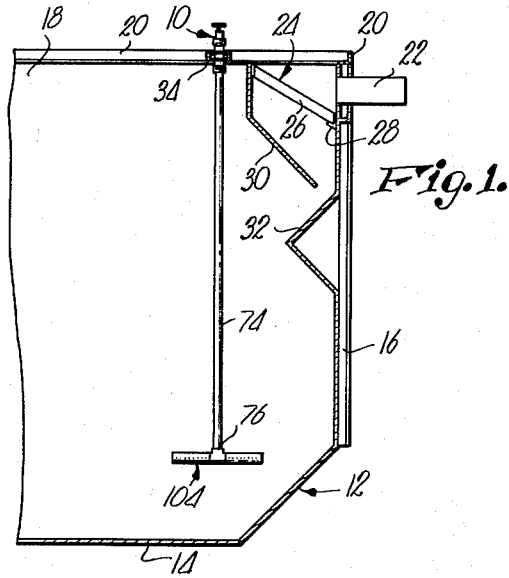
FIGURE 1 is a side elevational view of a portion of a sewage disposal tank and illustrating the interconnection therewith of a diffusion unit which embodies the preferred concepts of the present invention.

The diffusing unit which forms the subject of the present invention is broadly denoted by the numeral 10, and is adapted to be utilized with a sewage disposal tank 12 having a bottom wall 14, an end wall 16 secured to bottom wall 14, and an open top 18 defined by a plurality of interconnected channel members 20 as illustrated in FIG. 1.

Tank 12 is provided with an inlet 22 in end wall 16 adjacent the open top 18 thereof. A grill 24 comprised of a plurality of bars 26 is secured by means of a channel member 28 to the inner surface of side wall 16 substantially across the inlet 22 thereof to prevent the gravitation of sewage particles greater than a predetermined size toward the bottom wall 14. A pair of inclined baffles 30 and 32 is secured to channel members 20 and end wall 16, respectively, for providing a serpentine path for the sewage passing into the inlet 22 and through the grill 24 for subsequent gravitation toward bottom wall 14.

Figure 2:
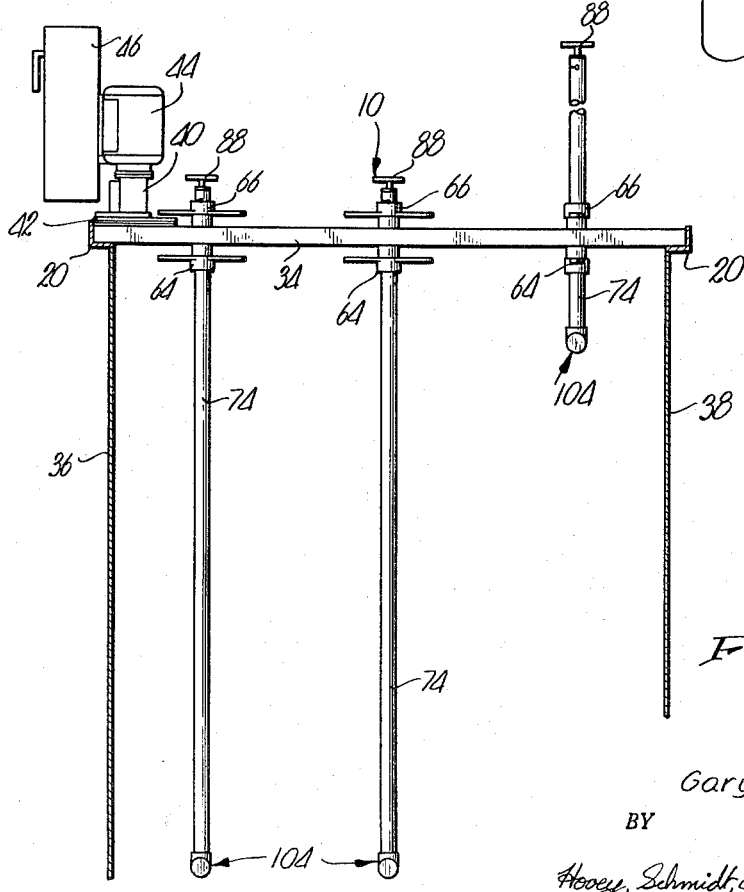
FIG. 2 is a cross-sectional view of the sewage disposal tank illustrated in FIG. 1 and showing a number of diffusing units mounted thereon for supplying air under pressure to the sewage therein.

A transversely polygonal, air delivery manifold 34 substantially spans the distance between a pair of sides 36 and 38 of tank 12 and is supported by the corresponding channel members 20 as is illustrated in FIG. 2. Manifold 34 is closed at opposed ends thereof adjacent sides 36 and 38 and is provided with an opening (not shown) at the end of the same adjacent side 36.

An air compressor 40 is mounted on a platform 42 secured in any suitable manner to the adjacent channel member 20, and compressor 40 is operably coupled with manifold 34 in fluid communication with the opening therein for supplying air under pressure to manifold 34. An electric motor 44 is operably coupled to compressor 40 for actuating the latter, and housing 46 adjacent motor 44 contains control mechanism for actuating motor 44 and thereby compressor 40. It is to be noted that the control mechanism in housing 46 is adapted to be operably coupled to a source of electrical power for actuating motor 44, together with associated switching apparatus for controlling the operation of the latter. Manifold 34 includes a pair of opposed side walls 48, a bottom wall 50, and a top wall 52.

Bottom wall 50 is provided with a plurality of longitudinally spaced openings 54 therein, and top wall 52 is provided with a plurality of longitudinally spaced openings 56 which are in alignment with corresponding openings 54. A tubular member 58 is secured in any suitable manner, such as by welding, at one end thereof to bottom wall 50 in surrounding relationship to a corresponding opening 54.

Tubular member 58 extends outwardly from bottom wall 50 and downwardly toward bottom wall 14 of tank 12. A tubular member 60 is secured to top wall 52 in surrounding relationship to a corresponding opening 56 in the latter, and extends upwardly therefrom in a direction opposite to the direction in which tubular member 58 extends. Tubular member 60 is provided with an end 62 in spaced relationship to top wall 52 as is clear in FIG. 4, and tubular member 58 also extends downwardly substantially the same distance away from bottom wall 50.

Tubular members 58 and 60 are externally threaded at the outermost ends thereof and threadably receive collars 64 and 66 respectively, the latter being internally threaded, and thereby being removably mounted on the corresponding members 58 and 60. Each of said collars 64 and 66 is provided with an outermost portion 68 having a reduced diameter relative to the diameter of the threaded portion thereof, to provide a beveled surface 70 intermediate the ends of the collar for a purpose to be described. A pair of handles 72 is secured to the threaded portion of each of collars 64 and 66 and project substantially laterally therefrom. Handles 72 are provided for applying leverage to the corresponding collars to rotate the same relative to the corresponding members 58 and 60.

An elongated conduit 74 in the nature of a transversely circular tube is received within openings 54 and 56 and extends through the corresponding tubular members 58 and 60. Each conduit 74 extends into tank 12 and is provided with a lowermost end 76 normally positioned adjacent to and spaced above the bottom wall 14 of tank 12.

Conduit 74 is substantially complemental with the corresponding openings 54 and 56 and tubular members 58 and 60, it being clear that the latter are transversely circular as are the openings 54 and 56. Conduit 74 is thereby shiftably mounted within openings 54 and 56 and tubular members 58 and 60 for movement relative to manifold 34 along a substantially vertical path when manifold 34 is horizontally disposed in spanning relationship to sides 36 and 38 of tank 12. It is to be noted that side walls 48 are disposed in laterally spaced relationship to openings 54 and 56 in bottom and top walls 50 and 52 respectively and, therefore, conduit 74 disposed in each of the openings 54 and 56, is substantially centrally located and in spaced relationship to the side walls 48.

Compressible sealing means 78 in the nature of a compressible O-ring, surrounds conduit 74 adjacent the outermost end of each of tubular members 58 and 60, it being clear that each tubular member 58 and 60 is provided with a beveled inner surface 80 against which O-ring 78 bears. When collars 64 and 66 are threadably mounted on tubular members 58 and 60 respectively, the surfaces 70 engage the O-ring 78 to force the latter against conduit 74 and the corresponding surfaces 80 to thereby seal the interconnection between members 58 and 60 and conduit 74.

Figure 3:
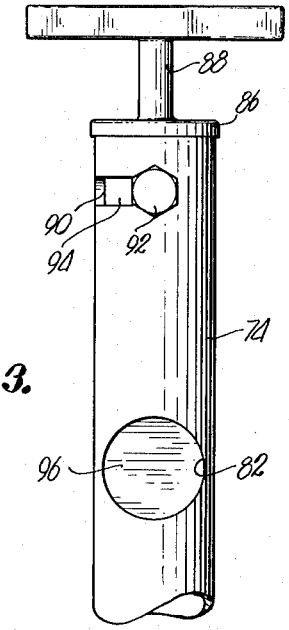
FIG. 3 is an enlarged, fragmentary, elevational view of a portion of a diffusing unit and illustrating an elongated conduit provided with an aperture therein for receiving air from manifold structure mounted on the sewage disposal tank for delivering air to a diffuser head.

Each conduit 74 is provided with an aperture 82 therein adjacent the normally uppermost end 84 thereof. Aperture 82 provides an air inlet for conduit 74 which is normally in fluid communication with manifold 34 to permit air to flow into conduit 74 and downwardly therethrough, it being noted that conduit 74 is provided with a cap 86 at the end 84 thereof for closing the latter. A handle 88 is secured in any suitable manner to cap 86 and extends upwardly therefrom as is illustrated in FIGS. 2 and 3. Handle 88 is in part utilized to shift conduit 74 relative to manifold 34 when it is desired to raise the lowermost end 76 of conduit 74 out of the tank 12.

Conduit 74 is provided with an arcuate slot 90 therein adjacent end 84 thereof and spaced below cap 86 as is illustrated in FIG. 3. Slot 90 receives therein a bolt 92 which is threadably mounted within a bore (not shown) in the normally uppermost end of a cylindrical element 94 which provides valve means for metering the amount of air passing from manifold 34 into aperture 82 of conduit 74.

Cylindrical element 94 provides a valve body having a portion thereof relieved to present an inclined surface 96 at the normally lowermost end thereof. Surface 96 is normally positioned within conduit 74 in alignment with aperture 82 thereof, element 94 having an arcuate surface 98 opposite to inclined surface 96 thereof for opening and closing aperture 82 as element 94 is rotated about the longitudinal axis thereof by manually rotating bolt 92 within slot 90. An annular groove 100 is disposed within element 94 intermediate the ends thereof for receiving an O-ring 102 engageable with the inner surface of conduit 74 to seal off the interconnection between element 94 and conduit 74.

A diffuser head 104 is mounted at the lowermost end 76 of each of conduits 74 and comprises a tubular component 106 closed at the ends thereof, and having a first opening 108 therein intermediate the ends thereof as is clear in FIG. 6. Neck portion 110 is secured to component 106 in surrounding relationship to first opening 108 and is internally threaded to threadably receive the lowermost end 76 of the corresponding conduit 74, thus removably mounting component 106 on the corresponding conduit 74.

Each component 106 is provided with a plurality of longitudinally spaced second openings 112 therein along a line diametrically opposed to a line extending longitudinally through opening 108. Openings 112 provide perforations for component 106 to permit air to issue from the latter under pressure when air is delivered thereto from conduit 74. It is to be noted that the longitudinal axis of component 106 is substantially perpendicular to the longitudinal axis of the corresponding conduit 74, and components 106 are normally positioned in perpendicular relationship to the plane of end wall 16 of tank 12. Openings 112 are, therefore, directed downwardly for discharging the air passing therethrough toward bottom wall 14.

An elongated sleeve 114 complementally engages the outer surface of component 106 on opposed sides of neck portion 110, and is secured to component 106 by a pair of stainless steel clamping bands 116 engaging the outer surface of sleeves 114. Bands 116 may be of the split-ring type for rapid installation and removal thereof from the ends of sleeves 114.

Each sleeve 114 is comprised of a length of yieldable material such as sheet rubber or the like, and tightly engages the outer surface of the corresponding portion of the component 106 in closing relationship to the openings 112 into the latter. Each sleeve 114 is provided with a plurality of spaced orifices 118 therein which are out of alignment with openings 112 and are positioned on opposed sides of the latter in circumferentially spaced relationship thereto. Air delivered to component 106 passes through openings 112 and along an arcuate path toward orifices 118 for subsequent discharge into the sewage contained within tank 12.

In operation, tank 12 is filled with sewage through inlet 22 to a predetermined level, and conduits 74 normally extend into the sewage with the components 106 adjacent to and spaced above bottom wall 14 in the positions illustrated in FIGS. 1 and 2. Cylindrical elements 94 within each conduit 74 are positioned by manually manipulating respective handles 88 to rotate elements 94 so that the arcuate surfaces 98 thereof are in a position relative to apertures 82 to permit a predetermined amount of air to pass into the corresponding conduit 74. Motor 44 is then energized by the actuation of control mechanism disposed within housing 46 and air compressor 40 is activated to supply air to manifold 34.

Air then flows into manifold 34, through apertures 82 and into conduit 74 at a predetermined pressure and in predetermined amounts depending upon the relationship of arcuate surfaces 98 to apertures 82. Air entering conduits 74 flows downwardly and into components 106 through openings 108 thereof and out of the latter through openings 112. The air then passes toward orifices 118 along an arcuate path and subsequently issues from orifices 118 laterally of component 106 into the sewage contained within tank 12.

When it is desired to elevate components 106 for inspection or replacement purposes, an operator grasps handle 88 of the appropriate conduit 74 and applies an upward force thereto for raising conduit 74 out of the interior of tank 12. Simultaneously therewith, the associated head 104 is elevated to a position adjacent the open top 18 of tank 12 and out of the sewage from which position the head 104 may be inspected or replaced. It is to be noted that conduit 74 and head 104 traverses a substantially vertical path as the same is elevated out of tank 12 and, by virtue of the annular lowermost surface 120 of collar 64, conduit 74 is stripped of sewage clinging thereto as the same is elevated. Conduit 74 is thereby cleaned of sewage as the same is lifted out of tank 12 to thereby prevent the contamination of structures and the atmosphere surrounding tank 12 adjacent the open top 18 thereof when the conduit 74 is elevated.

Since side walls 48 of manifold 34 are in spaced relationship to the conduit 74, one of the conduits 74 may be elevated out of the sewage in tank 12 while air is continuously supplied to the conduit 74 adjacent thereto. Thus, there is no interruption of the air supply to the remaining conduit 74 when one of the conduits 74 is lifted out of the sewage in tank 12.

As component 106 is lifted out of the sewage, sleeves 114 provide sealing means therefor to prevent the reverse flow of sewage into component 106 and thereby into the corresponding conduit 74.

Collars 64 and 66 are normally mounted on tubular members 58 and 60 respectively, so that O-rings 78 tightly engage the outer surface of the conduits 74. When it is desired to elevate the conduits 74, collars 64 and 66 are rotated to release the pressure on the O-rings 78 to thereby reduce the friction between the latter and the conduit 74 to permit unimpeded removal of the conduit 74 from the interior of tank 12. When the conduits 74 are once again inserted into tank 12, collars 64 and 66 are moved so that O-rings 78 once again tightly engage the outer surface of the conduit 74 to prevent the flow of air between the latter and tubular members 58 and 60.

The bolts 92 extending through conduits 74 and threaded into respective elements 94 serve as position limits for the on and off locations of elements 94, operate to hold elements 94 against the air pressure acting against inclined surfaces 96, and prevent conduits 74 from falling through the apertures thereof in manifold 34 and thus into the sewage when collars 64 and 66 are loosened.

Conduits 74 and components 106 are preferably formed from a lightweight, metallic material such as aluminum castings or the like. This permits a single individual to elevate the conduit 74 and components 106 out of the sewage in tank 12 with no assistance, and thus does away with bulky elevating apparatus normally required with diffusing units heretofore utilized.

As each conduit 74 is lifted out of tank 12, the air supply thereto is removed by virtue of the fact that aperture 82 thereof is moved out of alignment with manifold 34. Thus, air is prevented from entering the conduit 74 when the same is in an elevated position. Air may be continuously supplied to the remaining conduits 74 while one conduit 74 is in an elevated position thus preventing the blowing of air on the individual raising the conduit 74.

Air issues from orifices 118 at periodic intervals since the air pressure within component 106 is normally below the value of the elastic force maintaining sleeve 114 around component 106. The air pressure must build up to a higher value than that of the elastic force to permit air to pass from perforations 112 to orifices 118 and, in so doing, a finite amount of time elapses before the air pressure builds up to the aforesaid higher value. After air issues through orifices 118, the air pressure along the path between perforations 112 and orifices 118 drops, and once again the air pressure must build up to a value higher than that of the elastic force of sleeve 114.

The provision of a plurality of individually adjustable air diffusers is of importance because the delivery of air to the sewage may be deliberately unbalanced if desired to provide tapered aeration or some other pattern of distribution of air for a particular treatment purpose.

Having thus described the invention, what is claimed as new and desired to be secured by Letters Patent is:

1. A diffuser unit for introducing a treatment fluid into the substantially liquid waste products contained within a waste disposal tank, said diffuser unit comprising a manifold adapted to be mounted on said tank adjacent the top thereof in spaced relationship above the upper level of said liquid waste products and to be operably coupled with a source of treatment fluid under pressure, said manifold having a pair of generally vertically aligned openings therein; an elongated conduit vertically slidably disposed within said openings and projecting outwardly from said manifold in opposed directions, and upper and lower means in engagement with said conduit for sealing said openings, said conduit being slidable in contact with said sealing means from an upper retracted position out of the waste products downwardly into a lower operative position within said waste products, said conduit having an aperture adjacent the normally uppermost end thereof, said aperture being disposed between said upper and lower sealing means in fluid communication with said manifold only when said conduit is in said operative position; and a perforated diffuser head secured to said conduit at the normally lowermost end thereof and disposed in fluid communication therewith, said diffuser head being shiftable with said conduit and being disposed adjacent the bottom of said tank when said conduit is in said operative position and being disposed out of said waste products when said conduit is in said retracted position, whereby fluid is delivered to the waste products through the perforation in said diffuser head when the conduit is in said operative position and said diffuser is in an easily accessible location when the conduit is in said retracted position.

2. A diffuser unit as set forth in claim 1, wherein said conduit includes valve means shiftably mounted in said conduit and movable therewith for metering the fluid passing into said aperture from said manifold and means coupled with said valve means for shifting the latter.

3. A diffuser unit as set forth in claim 1, wherein said conduit is transversely circular, said valve means including a valve body complementally receivable within said conduit and being provided with an inclined face spaced inwardly from said aperture, said body having an arcuate surface portion opposed to said face and movable into and out of closing relationship to said aperture.

4. A diffuser unit as set forth in claim 1, wherein said diffuser head comprises an elongated, tubular component having a plurality of perforations therein, and including a flexible sleeve engaging said component in covering relationship to said perforations and provided with a plurality of orifices therein in spaced relationship to said perforations.

5. A diffuser unit as set forth in claim 4, wherein said sleeve complementally engages the outer surface of said component.

6. A diffuser unit as set forth in claim 1 wherein said conduit moves to its retracted position in a straight line along its lengthwise axis and said unit includes means for stripping solid waste from the outside surface of said conduit as said conduit is moved to its retracted postion.

7. A diffuser unit as set forth in claim 6 wherein said stripping means comprises a collar slidably receiving said conduit, and said collar is supported by said manifold structure.

8. A diffuser unit as set forth in claim 1 including means supplying a substantially continuous stream of pressurized gas to said manifold, and wherein said diffuser head comprises a tubular member coupled to receive said gas stream on the interior thereof, there being a hole in a side of said tubular member for escape of pressurized gas, elastic means surrounding said tubular member in tight engagement with the outside surface thereof so as to seal said hole, there being orifices in said elastic means, said orifices being out of alignment with said hole, gas pressure in said tube periodically building up to a value expanding said elastic means from sealing engagement around said hole permitting gas to pass between said tubular member and elastic means, whereby said gas escapes through said orifices into said liquid in periodic pulses.

9. The combination defined in claim 8 wherein said elastic means comprises a gas-impervious sleeve telescopically receiving a portion of said tubular member.

10. A diffuser unit for aerating the sewage contained within a sewage disposal tank comprising, a manifold secured to said tank adjacent the top thereof and above the upper level of the sewage therein, there being pairs of generally vertically aligned openings in said manifold; air compressor means adjacent said tank and operably coupled with said manifold for delivering air under pressure to said manifold; a plurality of elongated conduits each of which is vertically slidably mounted in a pair of said openings, generally vertically spaced gaskets between said conduits and manifold for sealing each pair of openings, each of said conduits being slidable through its associated gaskets in contact therewith from an upper retracted position out of the sewage to a lower operative position within the sewage, each of said conduits having an aperture in fluid communication with said manifold between its associated pair of gaskets only when said conduit is in said operative position; and a perforated diffuser head for each conduit and mounted on the lower end thereof in fluid communication therewith, each of said diffuser heads being disposed adjacent the bottom of the tank when the corresponding conduit is in operative position and being disposed out of said sewage when the corresponding conduit is in retracted position.

References Cited in the file of this patent

UNITED STATES PATENTS

| | | |
|---|---|---|
| 1,743,926 | Lord | Jan. 14, 1930 |
| 2,170,619 | Sica | Aug. 22, 1939 |
| 2,212,841 | Maxwell | Aug. 27, 1940 |
| 2,253,600 | Arneson | Aug. 26, 1941 |
| 2,328,655 | Lannert | Sept. 7, 1943 |
| 2,342,602 | Reitz | Feb. 22, 1944 |
| 2,530,195 | Giacobello | Nov. 14, 1950 |
| 2,631,020 | Malin | Mar. 10, 1953 |
| 2,682,827 | Gressly | July 6, 1954 |
| 2,715,609 | Hansen | Aug. 16, 1955 |
| 2,791,452 | Watson | May 7, 1957 |
| 2,854,827 | Lockerbie et al. | Oct. 7, 1958 |

FOREIGN PATENTS

| | | |
|---|---|---|
| 204,302 | Great Britain | Dec. 20, 1923 |
| 458,411 | Great Britain | Dec. 18, 1936 |
| 764,943 | Great Britain | Jan. 2, 1957 |